(12) United States Patent
Iljima et al.

(10) Patent No.: US 8,916,101 B2
(45) Date of Patent: *Dec. 23, 2014

(54) REDUCING AGENT AQUEOUS SOLUTION MIXING DEVICE AND EXHAUST GAS POST-TREATMENT DEVICE

(75) Inventors: Tadashi Iljima, Yuuki (JP); Hirofumi Kizawa, Oyama (JP); Boku Itou, Oyama (JP); Shinji Tsujimura, Ninomiya-machi (JP); Takashi Katou, Oyama (JP); Tetsuo Orita, Oyama (JP); Kanji Namimatsu, Oyama (JP); Issei Hara, Utsunomiya (JP); Hiroyuki Tomioka, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/696,293

(22) PCT Filed: Apr. 18, 2012

(86) PCT No.: PCT/JP2012/060459
§ 371 (c)(1),
(2), (4) Date: Nov. 5, 2012

(87) PCT Pub. No.: WO2013/099314
PCT Pub. Date: Jul. 4, 2013

(65) Prior Publication Data
US 2013/0164182 A1    Jun. 27, 2013

(30) Foreign Application Priority Data

Dec. 27, 2011    (JP) ................................. 2011-285450

(51) Int. Cl.
*B01D 50/00* (2006.01)

(52) U.S. Cl.
USPC .......................................... 422/176; 422/169

(58) Field of Classification Search
CPC .. B01F 5/0473; B01F 5/0498; B01F 3/04049; F01N 3/2892; Y02T 10/24
USPC .......................... 422/170, 176, 177, 169, 171
See application file for complete search history.

(56) References Cited

U.S. PATENT DOCUMENTS

| 5,284,016 A | 2/1994 | Stark et al. |
| D466,879 S | 12/2002 | Wada et al. |

(Continued)

FOREIGN PATENT DOCUMENTS

| CN | 101815851 A | 8/2010 |
| DE | 10 2007 055 874 A1 | 6/2008 |

(Continued)

OTHER PUBLICATIONS

The German Office Action for the corresponding German patent application No. 11 2012 000 021.8, issued on Jun. 12, 2014.

(Continued)

*Primary Examiner* — Tom Duong
(74) *Attorney, Agent, or Firm* — Global IP Counselors, LLP (57) ABSTRACT

A reducing agent aqueous solution mixing device includes an exhaust pipe, an injector, a mixing pipe and an inner pipe. The exhaust pipe includes an elbow part having a curved portion, and a linear part disposed downstream of the elbow part. The injector is disposed outside the curved portion and injects the reducing agent aqueous solution towards the linear part. The mixing pipe is disposed inside the elbow part to surround the reducing agent aqueous solution injected from the injector. The mixing pipe includes a plurality of openings on its outer peripheral surface. The inner pipe is disposed downstream of the mixing pipe and spaced apart from an outlet portion of the mixing pipe and from an inner wall of the linear part to allow the exhaust gas to flow through the inside of the inner pipe and along the outer periphery of the inner pipe.

5 Claims, 8 Drawing Sheets

(56) References Cited

U.S. PATENT DOCUMENTS

| | | | |
|---|---|---|---|
| D702,736 S | 4/2014 | Tomioka et al. | |
| 8,696,777 B1 | 4/2014 | Patil et al. | |
| D704,227 S | 5/2014 | Chino et al. | |
| D707,258 S | 6/2014 | Tomioka et al. | |
| 2003/0079467 A1 | 5/2003 | Liu et al. | |
| 2003/0110763 A1* | 6/2003 | Pawson et al. | 60/286 |
| 2007/0001405 A1 | 1/2007 | Watanabe et al. | |
| 2007/0110642 A1 | 5/2007 | Hirata | |
| 2007/0193252 A1 | 8/2007 | McKinley et al. | |
| 2008/0092526 A1 | 4/2008 | Kunkel et al. | |
| 2008/0216470 A1 | 9/2008 | Sedlacek et al. | |
| 2010/0146950 A1* | 6/2010 | Hayashi et al. | 60/301 |
| 2010/0178216 A1 | 7/2010 | Honda et al. | |
| 2010/0212292 A1 | 8/2010 | Rusch et al. | |
| 2010/0212301 A1 | 8/2010 | De Rudder et al. | |
| 2010/0263354 A1 | 10/2010 | Sedlacek et al. | |
| 2010/0263359 A1 | 10/2010 | Haverkamp et al. | |
| 2011/0011060 A1 | 1/2011 | McCarthy, Jr. | |
| 2011/0061374 A1* | 3/2011 | Noritake | 60/286 |
| 2011/0079003 A1 | 4/2011 | Sun et al. | |
| 2011/0094206 A1 | 4/2011 | Liu et al. | |
| 2011/0308234 A1 | 12/2011 | De Rudder et al. | |
| 2012/0124983 A1 | 5/2012 | Hong | |
| 2012/0324872 A1 | 12/2012 | Jaruvatee et al. | |
| 2013/0164181 A1 | 6/2013 | Iijima et al. | |
| 2013/0164182 A1 | 6/2013 | Iijima et al. | |
| 2013/0164183 A1 | 6/2013 | Iijima et al. | |
| 2013/0219871 A1 | 8/2013 | Crandell et al. | |

FOREIGN PATENT DOCUMENTS

| | | |
|---|---|---|
| DE | 10 2008 055 190 A1 | 7/2009 |
| DE | 10 2008 043 408 A | 5/2010 |
| DE | 10 2012 010 878 A1 | 12/2013 |
| EP | 2 184 455 A1 | 5/2010 |
| EP | 2314837 A1 | 4/2011 |
| EP | 2 578 828 A1 | 4/2013 |
| JP | 57-11261 U | 1/1982 |
| JP | 2004-270609 A | 9/2004 |
| JP | 2007-10099 A | 1/2007 |
| JP | 2008-14213 A | 1/2008 |
| JP | 2008-509328 A | 3/2008 |
| JP | 2008-151088 A | 7/2008 |
| JP | 2008-208726 A | 9/2008 |
| JP | 2009-19610 A | 1/2009 |
| JP | 2009-30560 A | 2/2009 |
| JP | 2009-62816 A | 3/2009 |
| JP | 2009-138627 A | 6/2009 |
| JP | 2009-156072 A | 7/2009 |
| JP | 2009-156076 A | 7/2009 |
| JP | 2009-156078 A | 7/2009 |
| JP | 2009-167806 A | 7/2009 |
| JP | 2009-174485 A | 8/2009 |
| JP | 2010-101236 A | 5/2010 |
| JP | 2010-156078 A | 7/2010 |
| JP | 2010-180863 A | 8/2010 |
| JP | 2011-32970 A | 2/2011 |
| JP | 2011-64069 A | 3/2011 |
| JP | 2011-64069 A | 3/2011 |
| JP | 2011-99390 A | 5/2011 |
| JP | 2011-202512 A | 10/2011 |
| JP | 2011-247128 A | 12/2011 |
| WO | WO-2006/025110 A1 | 3/2006 |
| WO | 2009/024815 A2 | 2/2009 |

OTHER PUBLICATIONS

The US Office Action for the related U.S. Appl. No. 14/000,521, issued on Jun. 10, 2014.

The German Office Action for the corresponding German patent application No. 11 2012 000 035.8, issued on Jul. 15, 2014.

The German Office Action for the corresponding German patent application No. 11 2013 000 009.1, issued on Jun. 23, 2014.

The German Office Action for the corresponding German patent application No. 11 2013 000 011.3, issued on Jun. 23, 2014.

The German Office Action for the corresponding German patent application No. 11 2012 000 089.7, issued on Jul. 1, 2014.

Second Chinese Office Action for the corresponding Chinese application No. 201280001587.7, issued on May 19, 2014.

The Chinese Office Action for the corresponding Chinese application No. 101815851, issued on Dec. 26, 2013.

* cited by examiner

REDUCING AGENT AQUEOUS SOLUTION MIXING DEVICE AND EXHAUST GAS POST-TREATMENT DEVICE

CROSS-REFERENCE TO RELATED APPLICATIONS

This application claims priority to Japanese Patent Application No. 2011-285450 filed on Dec. 27, 2011, the disclosure of which is hereby incorporated herein by reference in its entirety.

TECHNICAL FIELD

The present invention relates to a reducing agent aqueous solution mixing device, particularly to, a reducing agent aqueous solution mixing device for adding a reducing agent aqueous solution to exhaust gas, which is disposed between a filter for trapping particulate substance in the exhaust gas and a reducing catalyst unit for reducing and purifying nitrogen oxide in the exhaust gas while being disposed parallel to the filter. Further, the present invention relates to an exhaust gas post-treatment device including the aforementioned reducing agent aqueous solution mixing device.

BACKGROUND ART

The exhaust gas of engines contains nitrogen oxide (NOx). An exhaust gas post-treatment device is disposed at an intermediate position in an exhaust path for inhibiting emission of the nitrogen oxide into the air. The exhaust gas post-treatment device includes a filter for trapping particulate substance in the exhaust gas, a urea aqueous solution mixing device disposed on the exhaust downstream side of the filter in order to add a urea aqueous solution to the exhaust gas, and a reducing catalyst unit disposed on the further downstream side of the mixing device in order to reduce and purify nitrogen oxide in the exhaust gas.

The urea aqueous solution mixing device in the aforementioned exhaust gas post-treatment device includes an injector that injects a urea aqueous solution as a reducing agent into an exhaust pipe. The urea aqueous solution, injected into the exhaust pipe from the injector, is mixed with the exhaust gas and is supplied to the reducing catalyst unit on the exhaust downstream side. Here, firstly, the urea aqueous solution is thermally decomposed by the exhaust gas and ammonia is thereby obtained. Then, in the reducing catalyst unit, the ammonia is used as a reducing agent and the nitrogen oxide in the exhaust gas is reduced and purified.

In such device, a sufficient reaction time is required for thermally decomposing the urea aqueous solution and thereby obtaining ammonia. To achieve this, it is required to reliably produce a long distance between the injector and the reducing catalyst unit. When the distance is short, the urea aqueous solution injected within the exhaust pipe is not sufficiently mixed with the exhaust gas, while partially attaching as droplets to the inner wall of the exhaust pipe cooled by the external air. The urea aqueous solution, thus attached to the inner wall of the exhaust pipe, is not easily decomposed. Therefore, there may be deficiency in ammonia to be supplied to the reducing catalyst unit. Further, the urea aqueous solution, changed into droplets on the inner wall of the exhaust pipe, may be crystallized and deposited on the inner wall.

In view of the above, as described in Publication of Japanese Translation of PCT International Application No. JP-A-2008-509328 and WO2006/025110 A1, devices have been provided that a double-nested pipe structure is produced by disposing an inner pipe within an exhaust pipe on the exhaust downstream side of an injector and a urea aqueous solution is configured to be injected into the inner pipe. The exhaust gas herein flows around the outer peripheral part of the inner pipe. Therefore, the inner pipe is heated by the exhaust gas, and accordingly, the urea aqueous solution can be inhibited from attaching as droplets to the inner wall of the inner pipe.

Further, US2010/0263359 A1 and Japan Laid-open Patent Application Publication No. JP-2008-208726 describe devices configured to be capable of sufficiently decomposing a urea aqueous solution even when the distance from an injector to a reducing catalyst unit is short. In the devices described in the literatures, a mixing pipe is disposed on the downstream side of the injector, and urea aqueous solution is configured to be injected from the injector into the mixing pipe. Further, the mixing pipe has a plurality of openings on the outer peripheral surface thereof. Turbulence is herein generated within the mixing pipe by causing the exhaust gas to flow into the mixing pipe through the openings of the mixing pipe. With use of the turbulence of the exhaust gas, dispersion of the urea aqueous solution is promoted and the decomposition efficiency of the urea aqueous solution into ammonia is enhanced.

SUMMARY

In the devices described in Publication of Japanese Translation of PCT International Application No. JP-A-2008-509328 and WO2006/025110 A1, the urea aqueous solution injected from the injector is supposed to collide against the inner pipe without being sufficiently dispersed, while the particle size thereof is kept large. Therefore, a large amount of heat is required to evaporate the droplets attached to the inner pipe. A sufficient amount of heat may not be reliably obtained only by the exhaust gas passing around the outer peripheral part of the inner pipe. In view of the above, the devices are required to be provided with a heater and the like as another heat source.

Further, in the devices described in US2010/0263359 A1 and Japan Laid-open Patent Application Publication No. JP-2008-208726, the exhaust gas and the urea aqueous solution easily get mixed inside the mixing pipe. However, a drawback may be caused that the urea aqueous solution is attached as droplets to the inner wall of the exhaust pipe cooled by the external air on the exhaust downstream side of the mixing pipe. Therefore, the drawbacks are not resolved that ammonia becomes deficient in the reducing catalyst unit and that sediment is formed on the inner wall of the exhaust pipe.

It is an object of the present invention to well mix a reducing agent aqueous solution such as a urea aqueous solution and the exhaust gas and to inhibit the reducing agent aqueous solution from attaching to the inner wall of the exhaust pipe in a device for mixing the reducing agent aqueous solution such the urea aqueous solution with the exhaust gas.

A reducing agent aqueous solution mixing device according to a first aspect is a device for adding a reducing agent aqueous solution to an exhaust gas, which is disposed between a filter trapping particulate substance in the exhaust gas and a reducing catalyst unit reducing and purifying nitrogen oxide in the exhaust gas, and includes an exhaust pipe, an injector, a mixing pipe and an inner pipe. The exhaust pipe includes an elbow part having a curved portion and a linear part disposed on an exhaust downstream side of the elbow part. The injector is disposed outside the curved portion of the elbow part and injects the reducing agent aqueous solution into the elbow part toward the linear part. The mixing pipe is disposed inside the elbow part for enclosing a surrounding of the reducing agent aqueous solution to be injected from the injector, and has a plurality of openings on an outer peripheral surface thereof. The inner pipe is disposed on an exhaust downstream side of the mixing pipe at an interval away from an exhaust downstream side outlet portion of the mixing pipe in a direction arranged along an exhaust stream and simultaneously at an interval away from an inner wall of the linear part, and allows the exhaust gas to flow through an inside thereof and an outer periphery thereof.

In the device, the exhaust gas, flowing to the elbow part from the upstream side, flows into the mixing pipe through the openings of the outer peripheral surface of the mixing pipe. Inside the mixing pipe, the reducing agent aqueous solution is injected from the injector. Therefore, the exhaust gas and the reducing agent aqueous solution are mixed inside the mixing pipe. The exhaust gas and the reducing agent aqueous solution, mixed in the mixing pipe, flow into the downstream inner pipe. The inner pipe is being heated by the exhaust gas flowing through the outer periphery thereof. Even when attached to the inner wall of the inner pipe, the reducing agent aqueous solution is evaporated and changed into ammonia. Therefore, the reducing agent aqueous solution can be inhibited from attaching as droplets to the inner wall of the exhaust pipe and that of the inner pipe.

Further, a predetermined interval is produced in a direction arranged along the exhaust stream between the outlet portion of the mixing pipe and the inner pipe. Therefore, the exhaust gas on the upstream side easily flows through the outer periphery of the inner pipe. Therefore, the inner pipe is efficiently heated by means of the exhaust gas and the decomposition efficiency of the reducing agent aqueous solution is promoted inside the inner pipe.

A reducing agent aqueous solution mixing device according to a second aspect relates to the device of the first aspect, and wherein an exhaust upstream side inlet portion of the inner pipe has an inner diameter greater than an inner diameter of the outlet portion of the mixing pipe.

Here, the exhaust gas and the reducing agent aqueous solution, mixed inside the mixing pipe, smoothly flow into the inner pipe.

A reducing agent aqueous solution mixing device according to a third aspect relates to the device of the second aspect, and wherein the mixing pipe and the inner pipe are disposed so that an outlet portion opening of the mixing pipe and an inlet portion opening of the inner pipe encompass an injection angular range of the injector.

Here, the outlet portion opening of the mixing pipe is formed wider than the diffusion range of the injected reducing agent aqueous solution. The injected reducing agent aqueous solution is thereby prevented from directly colliding against the inner wall of the mixing pipe. Therefore, the reducing agent aqueous solution can be inhibited from attaching as droplets to the inner wall of the mixing pipe. Further, the opening of the inlet portion of the inner pipe is wider than the diffusion range of the reducing agent aqueous solution. The infected reducing agent aqueous solution can be thereby efficiently inhaled into the inner pipe.

A reducing agent aqueous solution mixing device according to a fourth aspect relates to the device of any of the first to third aspects, and wherein the outlet portion of the mixing pipe is disposed at an interval away from an inner watt of the exhaust pipe. Further, a flow section is formed between the outlet portion of the mixing pipe and the inner wall of the exhaust pipe in order to direct the exhaust gas residing in the outer periphery of the mixing pipe to the inner pipe.

When members such as the mixing pipe and the inner pipe are herein disposed inside the exhaust pipe, it is required to prevent increase in flow path resistance. The flow path resistance is increased when the exhaust gas passes through the mixing pipe in such structures as described in US2010/0263359 A1 and Japan Laid-open Patent Application Publication No. JP-2008-208726 that all the exhaust gas, flowing from the upstream side, flows through the openings of the mixing pipe by closing between the outlet portion of the mixing pipe and the inner wall of the exhaust pipe. In this case, the back pressure of the engine is increased and thereby results in deterioration in fuel consumption.

In view of the above, according to the present fourth aspect, an interval is reliably produced between the outlet portion of the mixing pipe and the inner wall of the exhaust pipe, and the flow section is formed for directing the exhaust gas residing in the outer periphery of the mixing pipe to the inner pipe. With such structure, the flow path resistance is further reduced in the exhaust pipe, compared to the structure that all the exhaust gas is inhaled into the mixing pipe.

Therefore, the back pressure of the engine can be inhibited, and accordingly, deterioration in fuel consumption can be prevented.

A reducing agent aqueous solution mixing device according to a fifth aspect relates to the device of the fourth aspect, and wherein the mixing pipe is supported at an end portion thereof disposed oppositely to the outlet portion by an elbow part wall opposed to the linear part.

In such support structure of the mixing pipe, the vicinity of the outlet portion of the mixing pipe is not required to be supported with respect to the exhaust pipe. In other words, it is not required, to dispose a member for obstructing the flow of the exhaust gas in the flow section between the outlet portion of the mixing pipe and the exhaust pipe inner wall. Therefore, the flow path resistance in the exhaust pipe can be reduced.

A reducing agent aqueous solution mixing device according to a sixth aspect relates to the device of any of the first to fifth aspects, and wherein the plural openings of the mixing pipe are formed only in a partial angular range of the mixing pipe in a circumferential direction.

Here, the openings of the mixing pipe are funned only in a part of the outer peripheral surface of the mixing pipe. Therefore, the exhaust gas, inhaled into the mixing pipe through the openings, is supposed to form a constant stream. Therefore, the flow of the exhaust gas promotes the mixture of the exhaust gas and the reducing agent aqueous solution and the decomposition of the reducing agent aqueous solution.

A reducing agent aqueous solution mixing device according to a seventh aspect relates to the device of the sixth aspect, and wherein the plural openings of the mixing pipe are formed either only in first and third regions or second and fourth regions where an outer circumference of the mixing pipe is equally divided in four sequentially aligned regions consisting of the first region, the second region, the third region and the fourth region at 90-degree intervals in the circumferential direction.

Here, similarly to the sixth aspect, the exhaust gas inside the mixing pipe forms a constant stream. Therefore, the mixture of the exhaust gas and the reducing agent aqueous solution and the decomposition of the reducing agent aqueous solution are promoted.

A reducing agent aqueous solution mixing device according to an eighth aspect relates to the device of any of the first to seventh aspects, and further includes a support member including support portions for supporting a plurality of circumferential portions of an outer peripheral part of the inner pipe with respect to the exhaust pipe at a single position in a direction arranged along the exhaust stream. Further, except for the support portions, other regions between the support member and an outer peripheral surface of the inner pipe allow the exhaust gas to flow therethrough, and the inner pipe has no opening formed on the outer peripheral surface thereof.

Here, the outer peripheral part of the inner pipe is supported with respect to the exhaust pipe by the support portions of the support member. Further, the exhaust gas smoothly flows through the other regions except for the support portions in the outer periphery of the inner pipe. Yet further, the inner pipe has no opening formed on the outer peripheral surface thereof. Therefore, a sufficient amount of exhaust gas is supposed to flow through the outer periphery of the inner pipe. The inner pipe is thereby efficiently heated.

A reducing agent aqueous solution mixing device according to a ninth aspect relates to the device of any of the first to seventh aspects, and further includes a support member that supports an exhaust downstream side outlet portion of the inner pipe with respect to the exhaust pipe and restricts a flow of the exhaust gas residing between the outer peripheral surface of the inner pipe and the inner wall of the exhaust pipe. Further, the outlet portion of the inner pipe has a plurality of openings formed on an outer peripheral surface thereof.

Here, the support member restricts the flow of the exhaust gas at the outlet portion of the inner pipe. Therefore, the exhaust gas in the outer periphery of the inner pipe flows into the inner pipe through the openings of the outer peripheral surface of the inner pipe in the vicinity of the outlet portion. Therefore, the exhaust gas and the reducing agent aqueous solution are further mixed at the outlet portion of the inner pipe. Therefore, the decomposition of the reducing agent aqueous solution is further promoted.

A reducing agent aqueous solution mixing device according to a tenth aspect relates to the device of any of the first to ninth aspects, and wherein the mixing pipe and the inner pipe are coaxially disposed.

Here, the exhaust gas and the reducing agent aqueous solution, mixed in the mixing pipe, smoothly flow into the inner pipe.

An exhaust gas post-treatment device according to an eleventh aspect includes: a filter trapping particulate substance in an exhaust gas; the reducing agent aqueous solution mixing device recited in any of the first to tenth aspects disposed parallel to the filter on an exhaust downstream side of the filter; and a reducing catalyst unit that is disposed on the exhaust downstream side of the reducing agent aqueous solution mixing device and reduces and purifies nitrogen oxide in the exhaust gas.

An exhaust gas post-treatment device according to a twelfth aspect relates to the device of the eleventh aspect, and wherein the reducing catalyst unit is disposed parallel to the reducing agent aqueous solution mixing device According to the present invention as described above, in the reducing agent aqueous solution mixing device, the reducing agent aqueous solution such as the urea aqueous solution and the exhaust gas can be well mixed, and further, the reducing agent aqueous solution can be inhibited from attaching to the inner wall of the exhaust pipe.

DESCRIPTION OF THE EMBODIMENTS

Overall Structure

Figure 1:
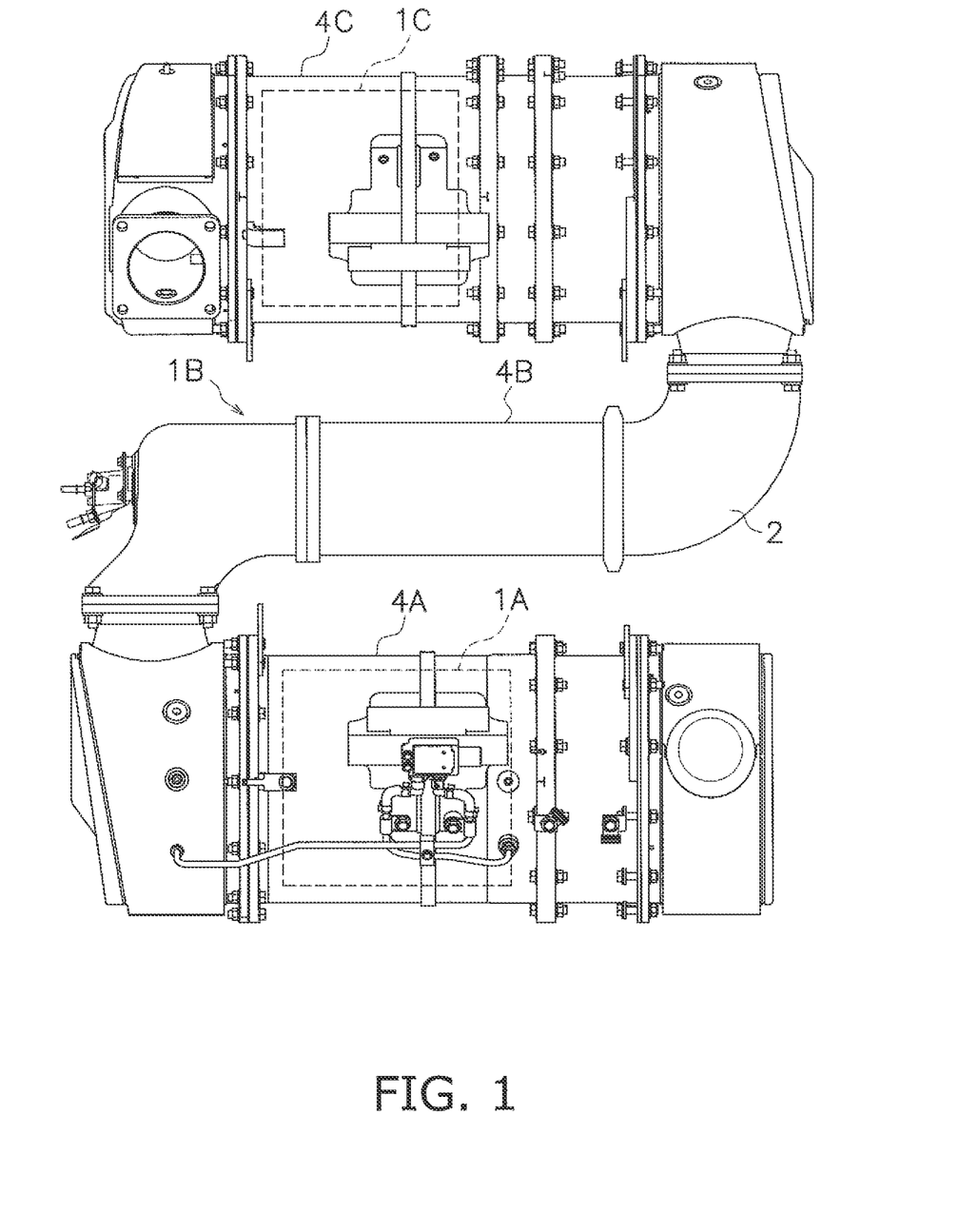
FIG. 1 is a structural diagram of an exhaust gas post-treatment device according to an exemplary embodiment of the present invention.

FIG. 1 is a structural diagram of an exhaust gas post-treatment device 1 according to an exemplary embodiment of the present invention. The exhaust gas post-treatment device 1 includes a diesel particulate filter (hereinafter referred to as "DPF") 1A, a urea aqueous solution mixing device 1B and a nitrogen oxide reducing catalyst unit (hereinafter referred to as "SCR") 1C, which are sequentially disposed from an exhaust upstream side (hereinafter simply referred to as "an upstream side"). Each of the devices is disposed in an intermediate portion of an exhaust pipe through which exhaust gas, discharged from a diesel engine (not illustrated in the figure) through an exhaust manifold, flows.

The DPF 1A serves to trap particulate substance in the exhaust gas and is accommodated within a case 4A.

The urea aqueous solution mixing device 1B serves to add a urea aqueous solution as a reducing agent to the exhaust gas. The added urea aqueous solution is hydrolyzed and changed into ammonia. The ammonia, together with the exhaust gas, is supplied to the SCR 1C through a connection pipe 2. It should be noted that the urea aqueous solution mixing device 1B will be explained below in detail.

In the SCR 1C, the ammonia from the urea aqueous solution mixing device 1B is used as a reducing agent and nitrogen oxide in the exhaust gas is reduced and purified. The SCR 1C is accommodated within a case 4C.

The case 4A accommodating the DPF 1A, the urea aqueous solution mixing device 1B, and the case 4C accommodating the SCR 1C are respectively disposed parallel. Further, the exhaust downstream side (hereinafter simply referred to as "a downstream side") end portion of the case 4A and the upstream side end portion of the urea aqueous solution mixing device 1B are coupled, while the downstream side end portion of the urea aqueous solution mixing device 1B and the upstream side end portion of the case 4C are connected through the curved connection pipe 2.

As described above, the case 4A, the urea aqueous solution mixing device 1B and the case 4C are disposed in an S-shape, and thereby, an entirely compact exhaust gas post-treatment device is formed. It should be noted that an oxidative catalyst unit may be disposed on the upstream side of the DPF 1A within the case 4A in order to execute an oxidative treatment for unburnt fuel in the exhaust gas. Further, an ammonia reducing catalyst unit may be disposed on the downstream side of the SCR 1C within the case 4C in order to execute an oxidative treatment for surplus ammonia.

Urea Aqueous Solution Mixing Device

Figure 2:
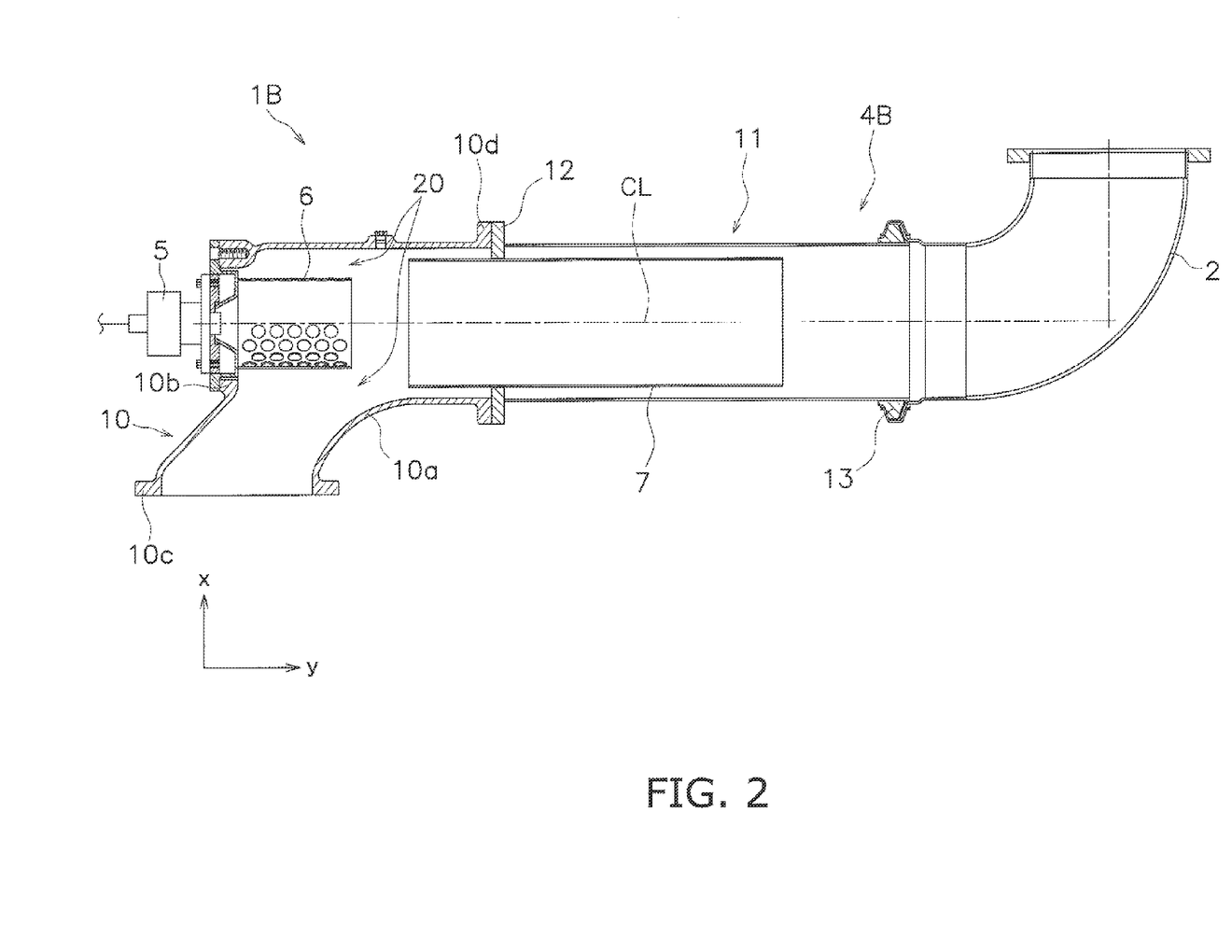
FIG. 2 is a cross-sectional structural diagram of a urea aqueous solution mixing device according to an exemplary embodiment of the present invention.

FIG. 2 illustrates the structure of the urea aqueous solution mixing device 1B according to an exemplary embodiment of the present invention. As described above, the urea aqueous solution mixing device 1B is disposed between the DPF 1A and the SCR 1C. It should be noted that the illustration in FIG. 1 also includes the connection pipe 2 connected to the downstream side of the urea aqueous solution mixing device 1B.

The urea aqueous solution mixing device 1B includes an exhaust pipe 4B, an injector 5 for injecting a urea aqueous solution, a mixing pipe 6 and an inner pipe 7.

Exhaust Pipe

The exhaust pipe 4B includes an elbow part 10 disposed on the exhaust upstream side (hereinafter simply referred to as "an upstream side") and a linear part 11 disposed on the downstream side of the elbow part 10. The elbow part 10 and the linear part 11 are both cylindrically formed.

The elbow part 10 is a connection pipe for causing the exhaust gas, flown thereto in an x-direction (a direction that the exhaust gas flows on the upstream side) depicted in FIG. 2, to flow in a y-direction perpendicular to the x-direction. The elbow part 10 has a curved portion 10a. An attachment portion 10b, formed by a plane arranged along the x-direction, is disposed on the outer part of the curved portion 10a. In other words, the attachment portion 10b faces the inlet-portion opening of the linear part 11. Further, a connection flanged portion 10c is formed on the upstream-side end portion of the elbow part 10, whereas a connection flanged portion 10d is formed on the downstream-side end portion of the elbow part 10. It should be noted that apertures into which connection bolts are fitted are formed in the flanged portions 10c and 10d.

The linear part 11 is a linear pipe extended along the y-direction. A connection-and-support flange (support member) 12 is welded to the upstream-side end portion of the linear part 11, whereas an annular adaptor 13 is welded to the downstream-side end portion of the linear part 11 in order to connect the connection pipe 2.

Figure 3:
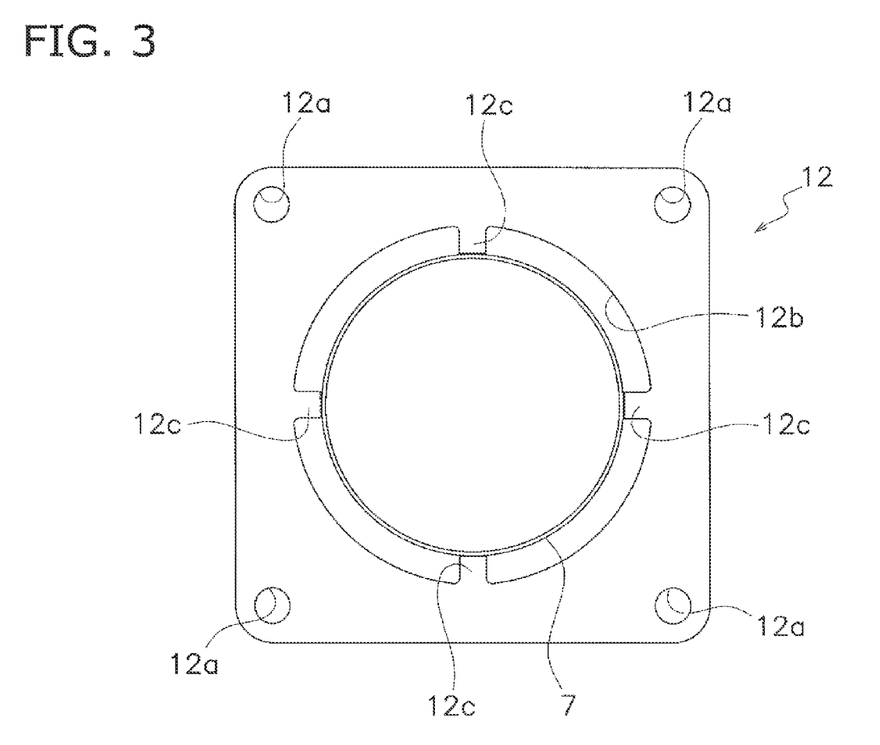
FIG. 3 is a front view of a flange.

As illustrated in FIG. 3, the flange 12 is a rectangular plate member. Apertures 12a, into which bolts are fitted for connecting the flange 12 to the flanged portion 10d of the elbow part 10, are formed in four corner portions of the flange 12. Further, an aperture 12b, having the same diameter as the inner diameter of the linear part 11, is formed in the center part of the flange 12. Yet further, four support protrusions 12c, formed in the same shape, are disposed in the aperture 12b for protruding from the outer peripheral side towards the center part. The four support protrusions 12c are disposed at equal angular intervals.

The elbow part 10 and the linear part 11 are coupled by fixing such flange 12 to the flanged portion 10d of the elbow part 10 by means of the bolts.

Injector

The injector 5 is attached, together with the mixing pipe 6, to the attachment portion 10b on the outer part of the curved portion 10a of the elbow part 10. The attachment structure will be described below in detail. The injector 5 injects only a urea aqueous solution, without mixing it with air, from an injection outlet of the tip thereof into the mixing pipe 6 towards the linear part 11. The injector 5, used in the present exemplary embodiment, has an injection angle of 25 degrees, and the center of the injection outlet of the injector 5 is positioned on a line extended from a center axis CL of the liner part 11 of the exhaust pipe 4B.

Mixing Pipe

Figure 4:
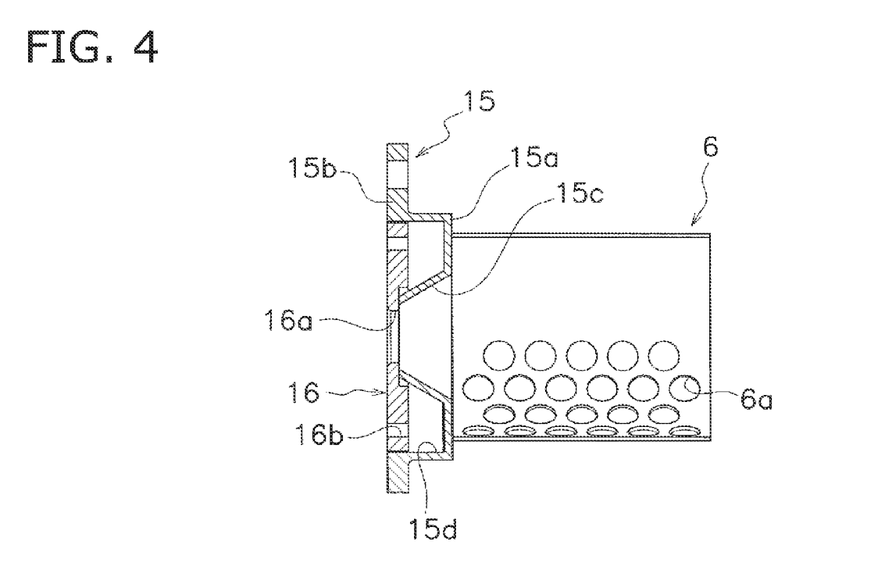
FIG. 4 is a diagram illustrating a mixing pipe and an attachment structure thereof.
Figure 5:
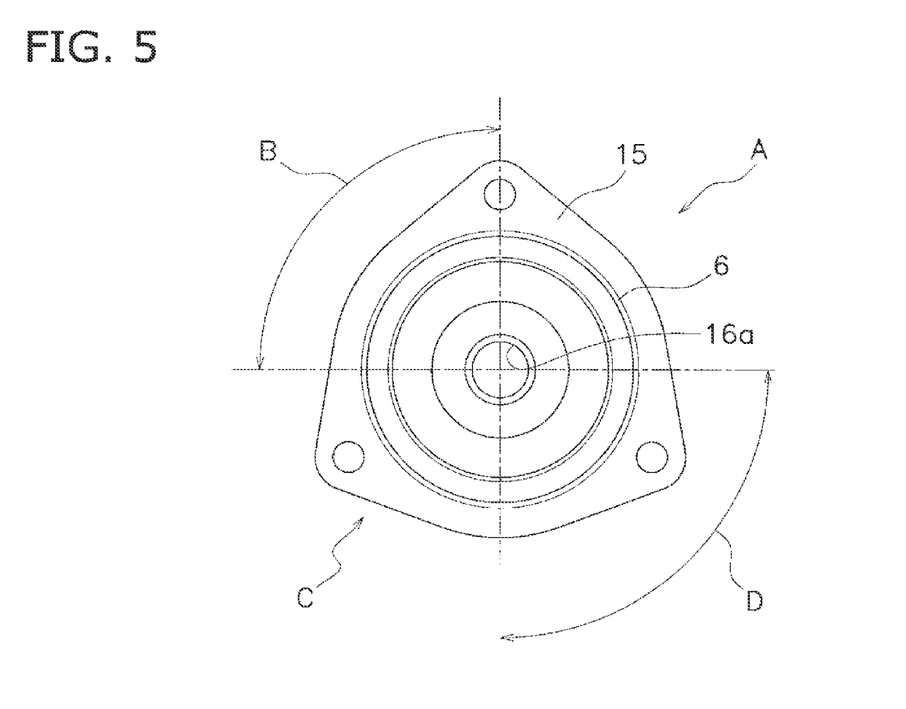
FIG. 5 is a right side view of FIG. 4.

The mixing pipe 6 is formed as a sub-unit together with a member for fixing the mixing pipe 6 to the elbow part 10 and etc. FIGS. 4 and 5 illustrate the sub-unit. It should be noted that FIG. 5 is a right side view of FIG. 4.

The mixing pipe 6 has a cylindrical shape, and the center axis thereof is coaxial to the center axis CL of the linear part 11. The mixing pipe 6 is disposed in a position within the elbow part 10 where the urea aqueous solution is injected inside from the injector 5. In other words, the mixing pipe 6 is disposed for enclosing the surrounding of the urea aqueous solution to be injected from the injector 5. The mixing pipe 6 has a plurality of openings 6a formed on the outer peripheral surface thereof. As illustrated in FIG. 5, the plural openings 6a are formed only in a second region B and a fourth region D, where the outer circumference of the mixing pipe 6 is equally divided into four sequentially aligned regions consisting of a first region A, the second region B, a third region C and the fourth region D at 90-degree intervals in the circumferential direction.

A first plate 15 is fixed to an upstream-side end portion (a left-side end portion in FIGS. 2 and 4), disposed on the opposite side of the outlet, of the mixing pipe 6 by means of welding. As illustrated in FIG. 5, the first plate 15 has a roughly triangle contour with a curved portion as each side thereof, and has a pipe fixation portion 15a, an attachment portion 15b and a guide portion 15c. An end of the mixing pipe 6 is fixed to the pipe fixation portion 15a by means of welding. The attachment portion 15b is formed on the outer peripheral side of the pipe fixation portion 15a for forming a step with the pipe fixation portion 15a. The attachment portion 15b is attached to the attachment portion 10b of the elbow part 10 by means of bolts. Further, the guide portion 15c is formed in the middle part of the pipe fixation portion 15a, while being formed in tapered shape that the diameter thereof is reduced in proportion to distance outwardly away from the pipe fixation portion 15a. It should be noted that the guide portion 15c has an opening formed on an end thereof disposed on the opposite side of the pipe fixation portion 15a.

The first plate 15 has a recessed portion 15d formed on the opposite side of the mixing pipe 6. A second plate 16 is fixed to the recessed portion 15d by means of welding while being fitted therein. The second plate 16 is formed in a disc shape and has an aperture 16a, in which the injection outlet of the injector 5 is disposed, in the middle part thereof. Further, the second plate 16 has a plurality of screw apertures 16b, and the injector 5 is supported by the second plate 16 through the screw apertures 16b.

Inner Pipe

As illustrated in FIGS. 2 and 3, the inner pipe 7 is formed in a cylindrical shape, the outer peripheral surface thereof is supported by the tips of the support protrusions 12c of the flange 12, and these are welded and fixed to each other. Accordingly, the inner pipe 7 is disposed at an interval away from the inner wall of the linear part 11 on the downstream side of the mixing pipe 6. In other words, a double nested pipe is firmed by the inner pipe 7 and the linear part 11. Further, the inner pipe 7 has an inner diameter greater than the outer diameter of the mixing pipe 6. The inner pipe 7 is disposed at a predetermined distance away from the outlet of the mixing pipe 6.

It should be noted that the inner pipe 7 does not have any opening, slit and etc. formed on the outer peripheral surface thereof. Therefore, the exhaust gas does not flow between the outer periphery and the inner periphery of the inner pipe 7.

Arrangement of Respective Structural Members

Using FIG. 6, the positional relations among the injector 5 (an injection angle of the urea aqueous solution), the mixing pipe 6, the inner pipe 7, the exhaust pipe 4B including the elbow part 10 and the linear part 11 will be explained in detail. As described above, the mixing pipe 6 and the inner pipe 7 are herein disposed on the same axis. The injection outlet of the injector 5 is positioned on a line extended from the center axis CL of these members, while being opposed to an inlet-portion opening of the inner pipe 7.

Figure 6:
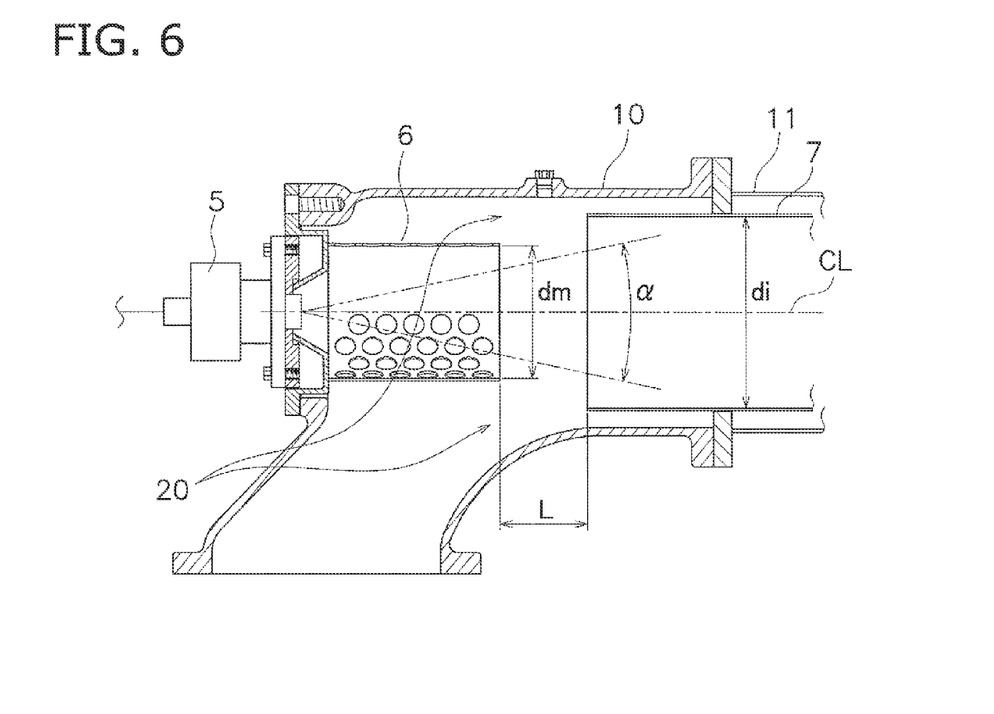
FIG. 6 is a diagram for explaining an injection angle of an injector, a mixing pipe and an arrangement of an inner pipe.

First, an interval exists between the outlet portion (the downstream-side end portion that corresponds to the right-side end portion in FIG. 6) of the mixing pipe 6 and the inner wall of the elbow part 10. The mixing pipe 6 is supported only at an end portion thereof disposed on the opposite side of the outlet portion thereof by the elbow part 10. Therefore, no member for supporting the mixing pipe 6 is disposed in the space. In other words, an annular flow section 20 is formed that there exists no member or the like obstructing the flow of the exhaust gas. Therefore, through the flow section 20, the exhaust gas, flowing thereto from the upstream side, can flow towards the inner pipe 7 without flowing through the inside of the mixing pipe 6.

Further, a predetermined interval L is produced in a y-direction between the outlet portion of the mixing pipe 6 and the inlet portion of the inner pipe 7. In addition, the inlet portion of the inner pipe 7 has an inner diameter di greater than an inner diameter dm of the outlet portion of the mixing pipe 6.

With the aforementioned arrangement and dimensional relations, an injection angular range of the injector 5 (a range inside an angle $\alpha$ (25 degrees in the present exemplary embodiment) in FIG. 6) is set to be narrower than the outlet-portion opening of the mixing pipe 6 and the inlet-portion opening of the inner pipe 7. In other words, the outlet-portion opening of the mixing pipe 6 and the inlet-portion opening of the inner pipe 7 encompass the injection angular range of the injector 5.

Actions

During the activation of the engine, the exhaust as is discharged to the exhaust pipe through the exhaust manifold. The exhaust gas flows towards the elbow part 10. As depicted with arrows G1 in FIG. 7, the exhaust gas, flowing into the elbow part 10, flows through the openings 6a of the outer peripheral surface of the mixing pipe 6 and flows into the mixing pipe 6. Further, as depicted with arrows G2 in FIG. 7, the exhaust gas flows through the flow section 20 formed between the outer peripheral surface of the mixing pipe 6 and the inner wall of the elbow part 10 and is directed to the inner pipe 7.

Figure 7:
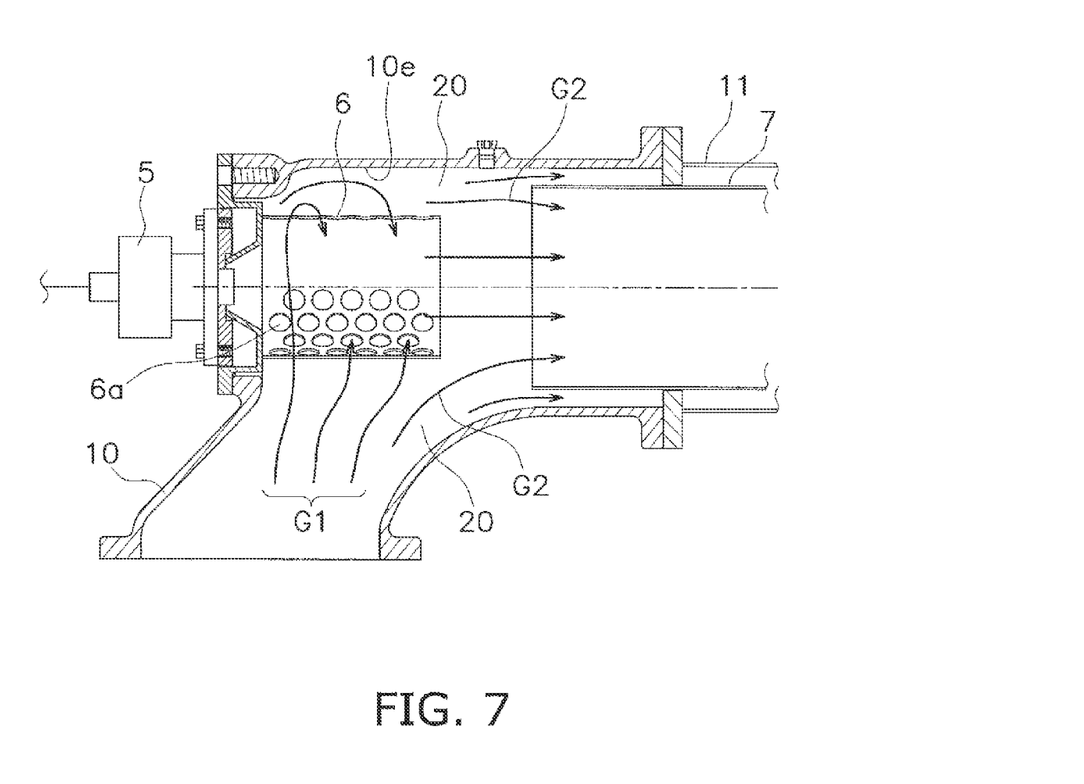
FIG. 7 is a diagram illustrating the flow of exhaust gas within an exhaust pipe.

On the other hand, the urea aqueous solution is injected from the injector 5 towards the inside of the mixing pipe 6. The urea aqueous solution is herein injected within a range of 25 degrees about the center axis of the mixing pipe 6.

The exhaust gas from the upstream side herein flows towards the region to which the urea aqueous solution is injected. However, the urea aqueous solution is injected towards the inside of the mixing pipe 6, whereas the exhaust gas flows into the mixing pipe 6 through the openings 6a of the mixing pipe 6. The injected urea aqueous solution is thereby less affected by the exhaust gas. Therefore, the urea aqueous solution is inhibited from attaching to the inner wall (especially, a region 10e in FIG. 7) of the elbow part 10 opposed to the mixing pipe 6.

Figure 8:
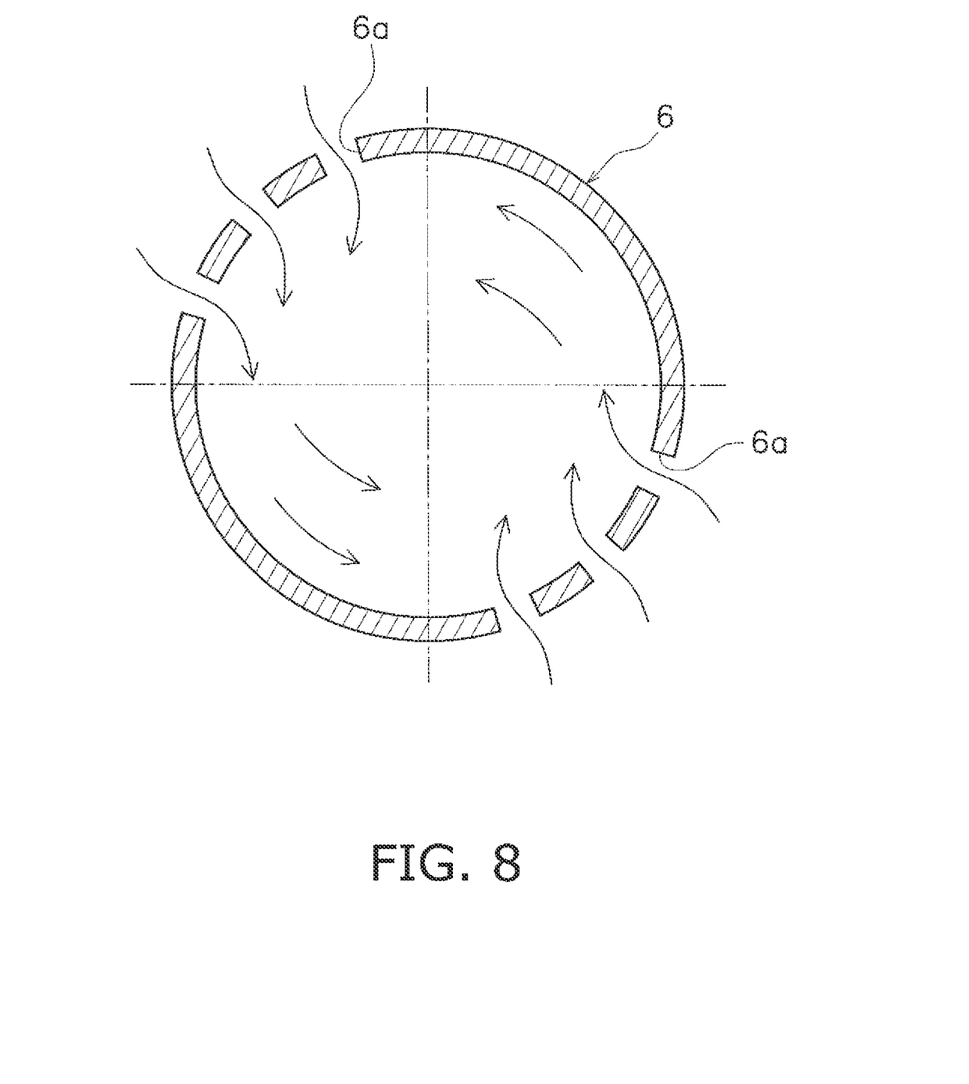
FIG. 8 is a diagram illustrating the flow of the exhaust gas within the mixing pipe.

Further, when flowing into the mixing pipe 6 through the openings 6a of the mixing pipe 6, the exhaust gas, flowing through the openings 6a, forms a helical flow inside the mixing pipe 6 as illustrated in FIG. 8 due to the openings 6 formed only in the second region B and the fourth region D. The helical flow of the exhaust gas is supposed to promote the mixture of the exhaust gas and the urea aqueous solution and promotes the miniaturization of the urea aqueous solution.

As described above, the exhaust gas to which the urea aqueous solution is added in the mixing pipe 6 and the exhaust gas having flown through the flow section 20 flow into the inner pipe 7. The exhaust gas, having flown through the flow section 20, mainly flows downstream through the outer periphery of the inner pipe 7, i.e., the space between the outer peripheral surface of the inner pipe 7 and the inner wall of the exhaust pipe 4B. The inner pipe 7 is thereby heated. Further, inside the inner pipe 7, the urea aqueous solution is hydrolyzed and changed into ammonia by means of the heat of the exhaust gas and the water vapor in the exhaust gas.

The urea aqueous solution is herein attached to the inner wall of the inner pipe 7. However, as described above, the inner pipe 7 is being heated by means of the exhaust gas flowing through the outer periphery thereof. Therefore, chemical reactions are promoted and the urea aqueous solution is inhibited from attaching to the inner pipe 7.

The ammonia, produced as described above, is supplied together with the exhaust gas to the SCR. Then, the ammonia is used as a reducing agent in the reducing catalyst unit and nitrogen oxide in the exhaust gas is reduced and purified.

Features (1) The urea aqueous solution is injected into the mixing pipe 6, whereas the exhaust gas flows into the mixing pipe 6 through the openings 6a of the mixing pipe 6. Therefore, the urea aqueous solution is inhibited from attaching to the inner wall of the elbow part 10.

(2) The openings 6a are formed only in a partial region of the outer peripheral surface of the mixing pipe 6. Therefore, the exhaust gas, having flown into the mixing pipe 6 through the openings 6a, becomes the helical flow. The helical flow of the exhaust gas well disperses the urea aqueous solution injected from the injector 5 and miniaturization thereof is promoted inside the mixing pipe. Therefore, the exhaust gas and the urea aqueous solution are uniformly mixed.

(3) The exhaust gas, to which the urea aqueous solution is added, flows through the inner pipe 7 heated by the exhaust gas. Therefore, the urea aqueous solution can be inhibited from attaching and accumulating onto the inner wall of the inner pipe 7.

(4) The flow section 20 is formed on the outer periphery of the outlet portion of the mixing pipe 6. The exhaust gas, having flown from the upstream side, flows into the mixing pipe 6, while flowing through the flow section 20 and being directed to the inner pipe 7. Therefore, the flow path resistance in the exhaust gas is reduced within the exhaust pipe 4B and the back pressure of the engine is inhibited.

(5) The mixing pipe 6 is supported only at the end portion thereof disposed on the opposite side of the outlet portion thereof by the elbow part 10. No member or the like for obstructing the flow of the exhaust gas exists in the flow section 20 on the outer periphery of the outlet portion. Therefore, the flow path resistance can be further reduced within the exhaust pipe 4B.

(6) A predetermined interval is produced between the outlet portion of the mixing pipe 6 and the inlet portion of the inner pipe 7 in the direction arranged along the exhaust stream, and the inlet portion of the inner pipe 7 has a diameter greater than that of the outlet portion of the mixing pipe 6. Further, the outlet-portion opening of the mixing pipe 6 and the inlet-portion opening of the inner pipe 7 encompass the injection angular range of the urea aqueous solution to be injected from the injector 5. Therefore, the exhaust gas easily flows into the inner pipe 7, and in addition, the urea aqueous solution injected from the injector 5 is prevented from directly colliding against the inner wall of the mixing pipe 6. Further, the injected urea aqueous solution can be efficiently inhaled into the inner pipe 7.

Other Exemplary Embodiments

The present invention is not limited to the aforementioned exemplary embodiment, and a variety of changes or modifications can be herein made without departing from the scope of the present invention.

Figure 9:
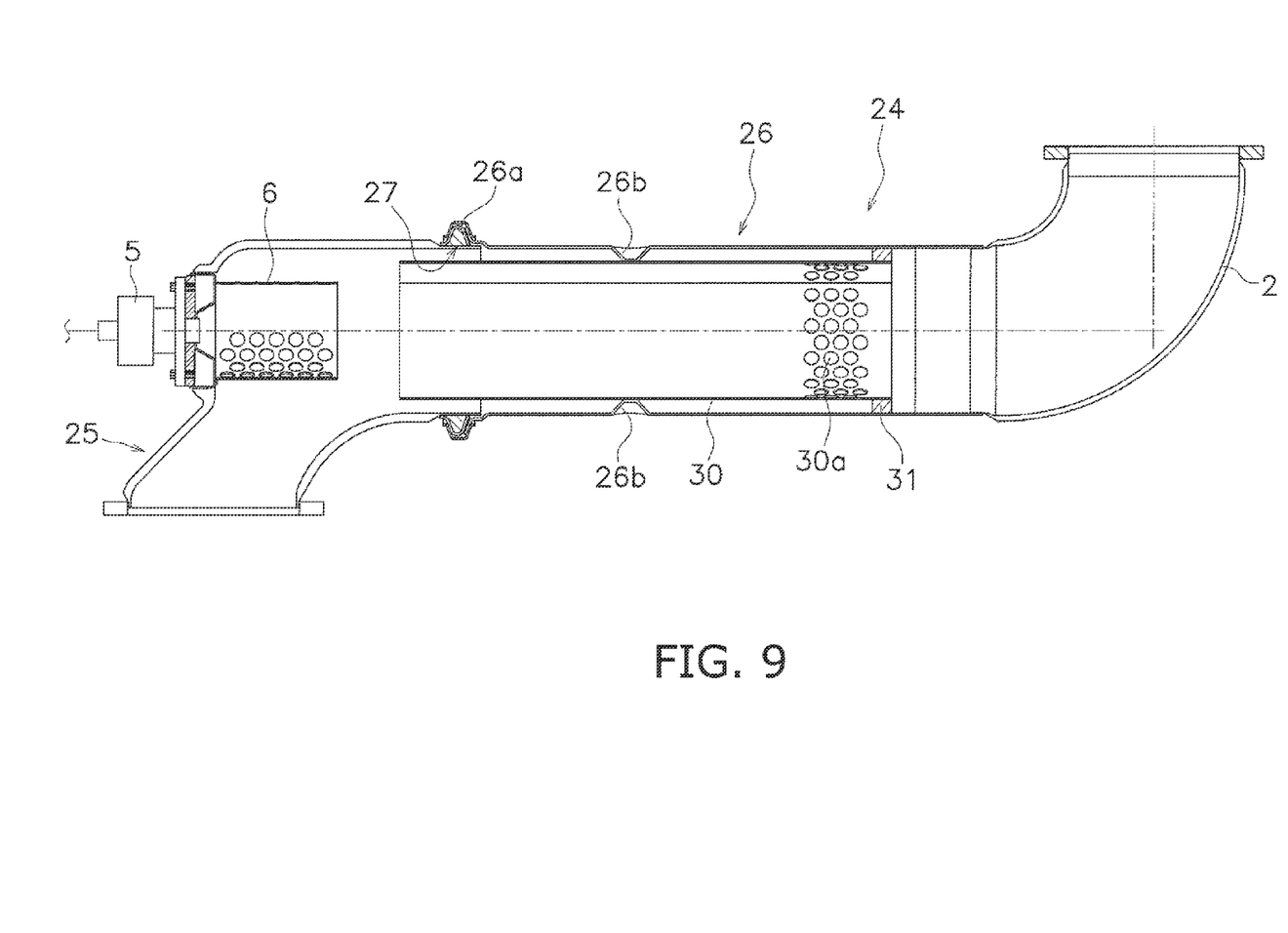
FIG. 9 is a diagram, corresponding to FIG. 2, according to another exemplary embodiment of the present invention.

(a) FIG. 9 illustrates another exemplary embodiment. In the exemplary embodiment illustrated in FIG. 9, the inner pipe and the support structure thereof, and the connection structure between the elbow part and the linear part of the exhaust pipe are different from those of the aforementioned exemplary embodiment, while the other configurations are similar to those of the aforementioned exemplary embodiment.

An exhaust pipe 24 in the present exemplary embodiment is formed by an elbow part 25 and a linear part 26.

The connection portion of the elbow part 25 to the linear part 26 is different from that of the elbow part 10 of the aforementioned exemplary embodiment, but the other configurations of the elbow part 25 are similar to those of the elbow part 10. The linear part 26 has a flanged portion 26a with a diameter increased upstream on the upstream-side end portion thereof. The elbow part 25 is provided with a flange unit 27, formed by an annular member and a gasket, on the downstream-side end portion thereof. Further, the flanged portion 26a of the linear part 26 is coupled to the flange unit 27 of the elbow part 25. Yet further, the linear part 26 has four support recessed portions 26b, recessed to the inner peripheral side, on a roughly intermediate portion thereof in the longitudinal direction along the exhaust stream.

An inner pipe 30 has a cylindrical shape and makes contact with the four support recessed portions 26b at the outer peripheral surface of the roughly intermediate part thereof in the longitudinal direction. Further, the outer peripheral surface of the outlet-side end portion of the inner pipe 30 is supported by the linear part 26 through an annular support member 31. The support member 31 is fixed to the outer peripheral surface of the outlet-side end portion of the inner pipe 30 by means of spot welding. Therefore, the support member 31 restricts the flow of the exhaust gas flowing through the outer periphery of the inner pipe 30. It should be noted that the term "restrict" herein includes a case of blocking all the exhaust gas flowing through the outer periphery of the inner pipe 30 and a case of allowing a small amount of the exhaust gas to flow therethrough.

Further, the inner pipe 30 has openings 30a on the outlet-side end portion thereof across a predetermined upstream-side range except for the region on which the support member 31 is disposed.

In such exemplary embodiment, the exhaust gas, flowing through the outer periphery of the inner pipe 30, heats the inner pipe 30 and then the flow thereof is restricted by the support member 31. Further, the exhaust gas, blocked by the support member 31, is directed inside the inner pipe 30 through the openings 30a of the inner pipe 30. Then, the exhaust gas is again mixed with the urea aqueous solution at the outlet portion of the inner pipe 30.

In such exemplary embodiment, the exhaust gas and the urea aqueous solution can be more efficiently mixed, in addition to advantageous effects similar to those of the aforementioned exemplary embodiment.

(b) The shape of the mixing pipe and the region in which openings are formed are not limited to those of the aforementioned exemplary embodiment.

Figure 10:
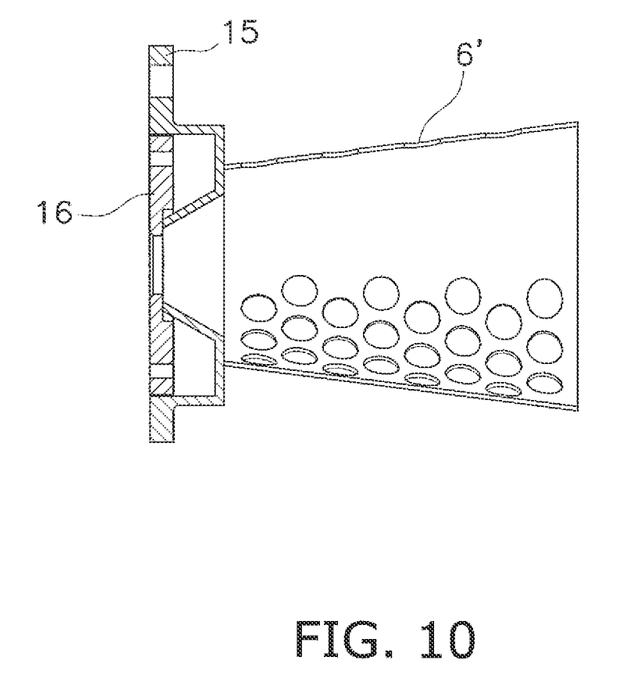
FIG. 10 is a diagram illustrating a mixing pipe according to yet another exemplary embodiment of the present invention.

For example, as illustrated in FIG. 10, a mixing pipe 6' may have such a tapered shape with a diameter increased downstream in the injection direction. In this case, the urea aqueous solution injected from the injector 5 can be inhibited from attaching to the inner wall of the mixing pipe 6'.

Further in the aforementioned exemplary embodiment, as illustrated in FIG. 5, the openings 6a are formed in the second region B and the fourth region D of the mixing pipe 6. However, openings may be formed in the first region A and the third region C, which are opposed to each other. Further, openings may be formed only in one of the four regions. Each region in which openings are formed is not limited to a 90-degree range. For example, openings may be formed in a region with an angular range of either less than 90 degrees or greater than 90 degrees.

(c) In the aforementioned exemplary embodiment, the urea aqueous solution has been used as a reducing agent. However, the present invention can be similarly applied even when another reducing agent is used.

According to the reducing agent aqueous solution mixing device according to the illustrated embodiments of the present invention, it is possible to well mix the reducing agent aqueous solution such as the urea aqueous solution and the exhaust gas, and further, to inhibit the reducing agent aqueous solution from attaching to the inner wall of the exhaust pipe.

The invention claimed is:

1. A reducing agent aqueous solution mixing device for adding a reducing agent aqueous solution to an exhaust gas, the reducing agent aqueous solution mixing device being adapted to be disposed between a filter for trapping particulate substance in the exhaust gas and a reducing catalyst unit for reducing and purifying nitrogen oxide in the exhaust gas, the reducing agent aqueous solution mixing device comprising:

an exhaust pipe including an elbow part having a curved portion, and a linear part disposed on an exhaust downstream side of the elbow part;

an injector disposed outside the curved portion of the elbow part, the injector being configured to inject the reducing agent aqueous solution into the elbow part towards the linear part;

a mixing pipe having a plurality of openings on an outer peripheral surface thereof, the mixing pipe being disposed inside the elbow part to enclose a surrounding of the reducing agent aqueous solution injected from the injector; and an inner pipe disposed inside the linear part of the exhaust pipe on an exhaust downstream side of the mixing pipe, the inner pipe being a separate member from the mixing pipe and spaced apart from an exhaust downstream side outlet portion of the mixing pipe in a direction along an exhaust stream, the inner pipe being spaced apart from an inner wall of the linear part and configured to allow the exhaust gas to flow through an inside thereof and an outer periphery thereof, the linear part of the exhaust pipe, the mixing pipe, and the inner pipe being cylindrical in shape and arranged coaxially with respect to one another.

2. The reducing agent aqueous solution mixing device recited in claim 1, wherein an exhaust upstream side inlet portion of the inner pipe has an inner diameter greater than an inner diameter of the outlet portion of the mixing pipe.

3. The reducing agent aqueous solution mixing device recited in claim 2, wherein the mixing pipe and the inner pipe are disposed so that an outlet portion opening of the mixing pipe and an inlet portion opening of the inner pipe encompass an injection angular range of the injector.

4. The exhaust gas post-treatment device recited in claim 1, wherein the mixing pipe has a tapered shape with a diameter that increases along the injection direction of the reducing agent aqueous solution towards the linear part.

5. A reducing agent aqueous solution mixing device for adding a reducing agent aqueous solution to an exhaust gas, the reducing agent aqueous solution mixing device being adapted to be disposed between a filter for trapping particulate substance in the exhaust gas and a reducing catalyst unit for reducing and purifying nitrogen oxide in the exhaust gas, the reducing agent aqueous solution mixing device comprising:

an exhaust pipe including an elbow part having a curved portion, and a linear part disposed on an exhaust downstream side of the elbow part;

an injector configured to inject the reducing agent aqueous solution into the elbow part towards the linear part;

a mixing pipe having a plurality of openings on an outer peripheral surface thereof, the mixing pipe being disposed inside the elbow part to enclose a surrounding of the reducing agent aqueous solution injected from the injector; and an inner pipe disposed inside the linear part of the exhaust pipe as a separate member from the mixing pipe on an exhaust downstream side of the mixing pipe, the inner pipe having an exhaust upstream inlet opening and an exhaust downstream outlet opening, the exhaust upstream inlet opening being spaced apart from an exhaust downstream side outlet portion of the mixing pipe in a direction along an exhaust stream, the inner pipe having an outer peripheral surface being spaced inward apart from an inner wall of the linear part to define a bypass passageway for a first portion of the exhaust gas to flow through an inside the inner pipe and a second portion of the exhaust gas to flow along the outer peripheral surface of the inner pipe in a space between the inner wall of the linear part.

* * * * *